US009125065B2

(12) United States Patent
Koo

(10) Patent No.: US 9,125,065 B2
(45) Date of Patent: Sep. 1, 2015

(54) APPARATUS AND METHOD FOR SUPPORTING SIMULTANEOUS DATA TRANSMISSION SERVICE OVER MULTIPLE NETWORKS

(71) Applicant: SK TELECOM CO., LTD., Seoul (KR)

(72) Inventor: Jahon Koo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/279,778

(22) Filed: May 16, 2014

(65) Prior Publication Data

US 2014/0247740 A1    Sep. 4, 2014

Related U.S. Application Data

(63) Continuation of application No. PCT/KR2012/009019, filed on Oct. 31, 2012.

(30) Foreign Application Priority Data

Nov. 16, 2011    (KR) .................. 10-2011-0119570

(51) Int. Cl.
*H04W 16/14*    (2009.01)
*H04W 28/02*    (2009.01)
*H04W 48/18*    (2009.01)

(52) U.S. Cl.
CPC .......... *H04W 16/14* (2013.01); *H04W 28/0252* (2013.01); *H04W 48/18* (2013.01)

(58) Field of Classification Search
USPC ............... 370/230, 230.1, 232, 235, 252, 328
See application file for complete search history.

(56) References Cited

U.S. PATENT DOCUMENTS

| 2005/0083850 A1* | 4/2005 | Sin et al. ................. 370/252 |
| 2007/0116012 A1* | 5/2007 | Chang et al. ............ 370/395.52 |
| 2013/0111038 A1* | 5/2013 | Girard .................... 709/226 |

FOREIGN PATENT DOCUMENTS

| KR | 100874152 B1 | 12/2008 |
| KR | 1020090081639 A | 7/2009 |
| KR | 1020110016749 A | 2/2011 |
| KR | 1020110097492 A | 8/2011 |

OTHER PUBLICATIONS

International Search Report mailed Mar. 28, 2013 for PCT/KR2012/009019.

* cited by examiner

*Primary Examiner* — Edan Orgad
*Assistant Examiner* — Saumit Shah
(74) *Attorney, Agent, or Firm* — Lowe Hauptman & Ham, LLP

(57) ABSTRACT

A transmitting device includes a partial data selector to select partial data divided from data to be transmitted over each of access networks based on a data transmission rate of each of the access networks; an identification information insertion unit to respectively insert identification information for measuring a data reception time interval into two or more partial data among the partial data selected for a particular access network of the access networks; a communication unit to transmit the two or more partial data with the inserted identification information to a receiving device through the particular access network; and a controller to acquire transmission state information of the particular access network based on at least one of a data transmission time interval and a data reception time interval.

16 Claims, 7 Drawing Sheets

APPARATUS AND METHOD FOR SUPPORTING SIMULTANEOUS DATA TRANSMISSION SERVICE OVER MULTIPLE NETWORKS

CROSS-REFERENCE TO RELATED APPLICATION

The instant application is a continuation of PCT/KR2012/009019, filed on Oct. 31, 2012, which is based on and claims priority to Korean Patent Application No. 10-2011-0119570, filed on Nov. 16, 2011. The disclosures of above-listed applications are hereby incorporated by reference herein in their entirety.

TECHNICAL FIELD

The present disclosure relates an apparatus and a method for supporting simultaneous data transmission service over multiple networks.

BACKGROUND ART

The statements in this section merely provide background information related to the present disclosure and do not constitute prior art.

Recently, communication services over a plurality of mobile communication networks including WCDMA, CDMA, WiBro, Long Term Evolution (LTE) and the like are provided. Also, a communication service based on a WLAN (WiFi) corresponding to a short-range wireless communication network is provided.

As described above, even in a multi-network environment where a plurality of networks coexist, it is general to select only one network from the plurality of networks to transmit data.

However, the inventor(s) has noted that such a known method has a limit on providing a seamless data service since a load factor of one selected network rapidly increases when large capacity data is transmitted/received. Further, the inventor(s) has experienced that the method is not suitable for an environment where various wireless devices such as a smart phone, a tablet Personal Computer (PC) and the like increase and various large capacity data services for the wireless devices also increase.

Accordingly, the inventor(s) has noted that in order to provide a smooth data service in the multi network environment a simultaneous transmission service has been proposed in which a transmitting device divides one data into a plurality of partial data and simultaneously transmits the divided partial data to a receiving device through two or more networks.

Meanwhile, the inventor(s) has experienced that it is required to variably set a transmission rate of the partial data according to a transmission state of each network to optimize the simultaneous transmission service.

SUMMARY

In accordance with an aspect of the present disclosure, a transmitting device includes: a partial data selector, an identification information insertion unit, a communication unit and a controller. The partial data selector is configured to select partial data divided from data to be transmitted over each of access networks based on a data transmission rate of each of the access networks. The identification information insertion unit is configured to respectively insert identification information for measuring a data reception time interval into two or more partial data among the partial data selected for a particular access network of the access networks. The communication unit is configured to transmit the two or more partial data with the inserted identification information to a receiving device through the particular access network. And the controller is configured to acquire transmission state information of the particular access network based on at least one of (i) a data transmission time interval between the transmitted two or more partial data and (ii) a data reception time interval measured by the receiving device based on the identification information inserted into the transmitted two or more partial data.

In accordance with another aspect of the present disclosure, a receiving device include a communication unit, a reception time measurement unit, and a controller. The communication unit is configured to receive partial data divided from data to be transmitted over a corresponding access network of access networks based on a data transmission rate of each of the access networks, the receive partial data including two or more partial data into which identification information used for measuring a data reception time interval has been inserted. The reception time measurement unit is configured to measure the data reception time interval between the two or more partial data among the received partial data. And the controller configured to acquire transmission state information of the corresponding access network based on at least one of (i) the measured data reception time interval and (ii) a data transmission time interval of the two or more partial data In accordance with another aspect of the present disclosure, a transmitting device is configured to select partial data divided from data to be transmitted over each of access networks based on a data transmission rate of each of the access networks; respectively insert identification information for measuring a data reception time interval into two or more partial data among the partial data selected for a particular access network of the access networks; transmit the inserted two or more partial data to a receiving device through the particular access network; and acquire transmission state information of the particular access network based on at least one of a data transmission time interval between the two or more partial data and a data reception time interval measured by the receiving device based on the identification information inserted into the transmitted two or more partial data.

In accordance with another aspect of the present disclosure, a receiving device is configured to receive partial data divided from data to be transmitted over a corresponding access network of access networks based on a data transmission rate of each of the access networks, the receive partial data including two or more partial data into which identification information used for measuring a data reception time interval has been inserted; measure the data reception time interval between the two or more partial data among the received partial data; and acquire transmission state information of the particular access network based on at least one of (i) the measured data reception time interval and (ii) a data transmission time interval.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, exemplary embodiments of the present disclosure will be described with reference to the accompanying drawings.

The present disclosure relates to an apparatus and a method for setting a partial data transmission rate of each network by using transmission state information of each network identified based on a partial data transmission time interval and reception time interval in a simultaneous transmission service in which data is divided into a plurality of partial data and the divided partial data are transmitted through a plurality of networks.

Figure 1:
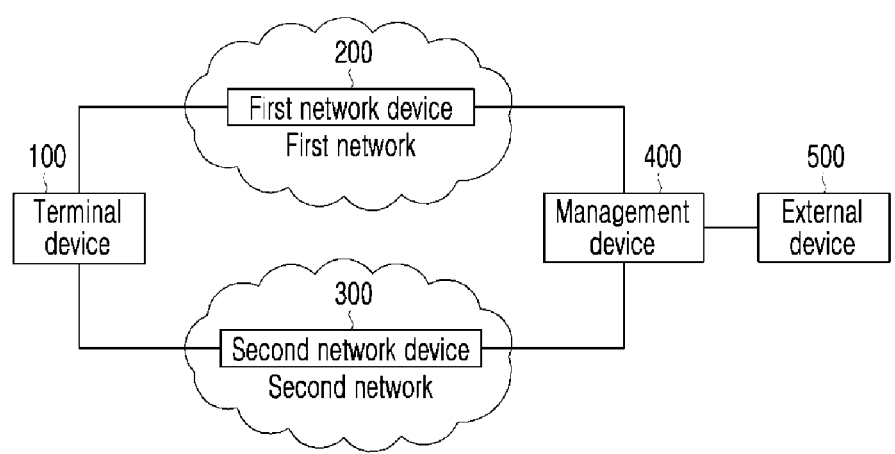
FIG. 1 is a schematic view of a configuration of a simultaneous data transmission service system over multiple networks according to at least one embodiment of the present disclosure.

FIG. 1 is a schematic view of a simultaneous transmission service system over multiple networks according to at least one embodiment of the present disclosure.

As illustrated in FIG. 1, the simultaneous data transmission service system over the multiple networks according to at least one embodiment of the present disclosure includes a terminal device 100, an external device 500 for providing data services such as an Internet service, a video providing service, an mVoIP service and the like to the terminal device 100, a first network device 200 for supporting a first network and a second network device 300 for supporting a second network, the first network device 200 and the second network device 300 connecting the terminal device 100 and the external device 500, and a management device 400 located between the terminal device 100 and the external device 500 to support a simultaneous transmission service for providing a data service provided by the external device 500 by using both the first network device 200 and the second network device 300. Other components of the simultaneous data service system, such as the terminal equipment 100, the first network device 200, the second network device 300 and the management device 400 are implemented by one or more processors and/or application-specific integrated circuits (ASICs).

The terminal device 100 refers to a user device for using the data service provided by the external device 500 and correspond to, for example, a mobile terminal, a Personal Computer (PC), a notebook computer, a tablet PC, a Personal Digital Assistant (PDA) or the like. However, the terminal device 100 is not limited thereto and includes all devices which can transmit/receive data through both the first network and the second network.

The multiple networks are a variety of networks including, for example, WCDMA, CDMA, WiBro, WLAN (WiFi), Long Term Evolution (LTE) and the like, in the at least one embodiment, they are limited thereto and includes all networks (e.g., networks including one or more homo/hetero communication networks) for providing wireless communication. Further, each of the first network and the second network is a network, for example, WCDMA, CDMA, WiBro, WLAN (WiFi), LTE or the like, but is not limited thereto and includes all networks (e.g., networks including one or more homo/hetero communication networks) for providing wireless communication.

In connection with this, when the first network is a 3G network, the first network device 200 is, for example, a Gateway GPRS Support Node (GGSN) of the 3G network. Further, when the second network is WiFi corresponding to one of short-range networks, the second network device 300 is, for example, an Access Point (AP) of WiFi.

In addition, the management device 400 refers to a server device for supporting the simultaneous transmission service to the terminal device 100 and is located on the first network, the second network, or a network separated from the first network and the second network to support the simultaneous transmission service.

Meanwhile, in a case of an uplink in which the terminal device 100 transmits data to the management device 400, the terminal device 100 is a transmitting device and the management device 400 is a receiving device. Reversely, in a case of a downlink in which the management device 400 transmits data to the terminal device 100, the terminal device 100 is the receiving device and the management device 400 is the transmitting device.

The simultaneous transmission service provided by at least one embodiment of the present disclosure simultaneously transmits partial data divided from one data by using a plurality of multiple networks (for example, 3G and WiFi). For improved service, a data transmission rate of the partial data according to states of the multiple networks (for example, 3G and WiFi) is optimally determined.

Accordingly, at least one embodiment of the present disclosure intends to provide a configuration of improving a data transmission capability in the simultaneous transmission service by measuring transmission state information of each network based on a result of comparison of a partial data transmission time interval and a partial data reception time interval for each network and variably setting an optimal data transmission rate of each network based on the measured transmission state information.

For the convenience of description, the following description will be made based on the downlink in which the management device 400 is the transmitting device and the terminal device 100 is the receiving device. However, the following description is equally applied to the uplink, and accordingly, a function of the terminal device 100 in the downlink is performed by the management device 400 in the uplink and a function of the management device 400 in the downlink is performed by the terminal device 400 in the uplink.

When the management device 400 receives data to be transmitted to the terminal device 100 from the external device 500, the management device 400 divides the data into partial data, identifies data transmission rates of access networks (for example, 3G and WiFi), that is, a first transmission rate for data transmission to the first network device 200 and a second transmission rate for data transmission to the second network device 300, selects first partial data to be transmitted to the first network device 200 from the partial data divided from the data to be transmitted based on the identified transmission rates, and selects second partial data to be transmitted to the second network device 300 from the remaining partial data.

Further, the management device 400 inserts identification information for measuring a data reception time interval into two or more particular partial data of the partial data selected for a particular access network. Alternatively, the management device 400 selects two or more partial data adjacent on a particular period time, that is, consecutive partial data for each of two or more access networks (for example, 3G and WiFi) and inserts identification information into the partial data.

Further, the management device 400 provides the simultaneous transmission service by transmitting the partial data selected for the respective access networks to the terminal device 100 through the two or more access networks.

That is, the management device 400 transmits each of the partial data selected for each of the access networks (for example, 3G and WiFi) through each of the access networks (for example, 3G and WiFi), the first network device 200 transmits the first partial data transmitted from the management device 400 to the terminal device 100, and the second network device 300 transmits the second partial data transmitted from the management device 400 to the terminal device 100.

At this time, in transmitting the partial data selected for each of the access networks, the management device 400 recognizes or measures a data transmission time interval between two or more partial data into which the identification information has been inserted for each of the access networks.

Meanwhile, the terminal device 100 corresponding to the receiving device receives the partial data through the two or more access networks, rearrange the received partial data according to a division order based on order information of the partial data, and combine the rearranged partial data, so as to reconstruct the data to be transmitted.

At this time, the terminal device 100 measures a data reception time interval between two or more particular partial data of which the identification information for measuring a data reception time interval is recognized among from the received partial data corresponding to the particular access network.

That is, the terminal device 100 searches for two or more adjacent partial data of which the identification information is recognized for each of the two or more access networks (for example, 3G and WiFi) through which the partial data are received and measure a data reception time interval between the partial data.

Thereafter, the terminal device 100 acquires transmission state information of the particular access network generated based on at least one of the measured data reception time interval and the data transmission time interval measured by the management device 400 having transmitted the two or more particular partial data. Further, based on the transmission state information of the particular access network, the data transmission rate of each of the access networks preset by the management device 400 is variably set.

Specifically, the management device 400 acquires the transmission state information of the particular access network based on at least one of the data transmission time interval between the two or more particular partial data and the data reception time interval measured by the receiving device according to the recognition of the identification information inserted into the two or more particular partial data.

According to a first embodiment, when the terminal device 100 provides a data reception time interval measured for each of the access networks (for example, 3G and WiFi) to the management device 400, the management device 400 receives the data reception time interval measured for each of the access networks (for example, 3G and WiFi).

Prior to the above, in transmitting the partial data selected for each of the access networks (for example 3G and WiFi), the management device 400 possessed (generated) the data transmission time interval by recognizing or measuring the data transmission time interval between two or more partial data into which the identification information has been inserted for each of the access networks.

Accordingly, the management device 400 acquires the transmission state information of each of the access networks by generating the transmission state information corresponding to each of the two or more access networks (for example, 3G and WiFi) based on the data transmission time interval recognized for each of the access networks (for example, 3G and WiFi) and the data reception time interval acquired from the terminal device 100 for each of the access networks (for example, 3G and WiFi).

That is, the management device 400 generates transmission state information of a 3G network based on a data transmission time interval corresponding to the 3G network and a data reception time interval corresponding to the data transmission time interval and generate transmission state information of a WiFi network based on a data transmission time interval corresponding to the WiFi network and a data reception time interval corresponding to the data transmission time interval.

Meanwhile, according to a second embodiment, when the terminal device 100 provides the transmission state information generated for each of the access networks to the management device 400, the management device 400 acquires the transmission state information for each of the access networks without generating the transmission state information for each of the access networks by itself.

The management device 400 variably sets a data transmission rate for each of the preset access networks based on the transmission state information for each of the access networks which has been generated by itself or provided and then acquired.

Meanwhile, instead of inserting identification information into the partial data by the management device 400, the management device 400 and the terminal device 100 possess a predetermined mutual measurement policy which measures a partial data transmission time interval and a data reception time interval. According to the above description, the transmission state information of each of the networks is generated and predicted by measuring the data transmission time interval and the data reception time interval of the same two or more particular partial data without the insertion of the identification information by the management device 400 and the recognition of the identification information by the terminal device 100.

Figure 2:
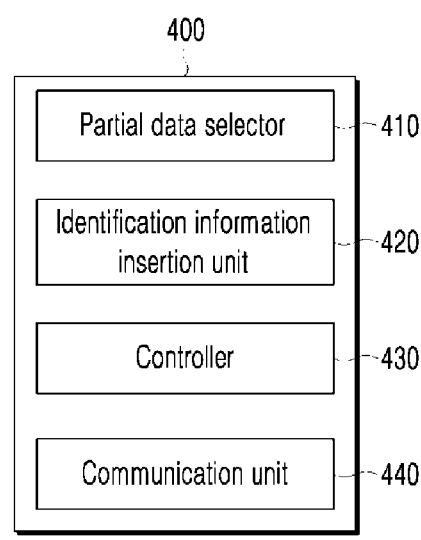
FIG. 2 is a schematic block diagram of a configuration of a simultaneous data transmission device over multiple networks according to at least one embodiment of the present disclosure.

Hereinafter, a configuration of a simultaneous data transmission device over multiple networks according to at least one embodiment of the present disclosure will be described in more detail with reference to FIG. 2.

The management device 400 according to at least one embodiment of the present disclosure includes a partial data selector 410 for selecting partial data divided from data to be transmitted according to each of the access networks based on a data transmission rate for each of the preset access networks, an identification information insertion unit 420 for inserting identification information for measuring a data reception time interval into two or more particular partial data selected for a particular access network, a communication unit 440 for transmitting the two or more particular partial data to the receiving device through the particular access network, and a controller 430 for acquiring transmission state information of the particular access network generated based on at least one of a data transmission time interval between the transmitted two or more particular partial data and a data reception time interval measured by the receiving device according to a recognition of the identification information inserted into the two or more particular partial data.

The communication unit 440 refers to, for example, a communication module for interworking with the first network device 200 by using the 3G network and interworking with the second network device 300 by using the WiFi network. Other components of the management device 400, such as the partial data selector 410, the identification information insertion unit 420, the controller 430 and the communication unit 440 are implemented by one or more processors and/or application-specific integrated circuits (ASICs).

The partial data selector 410 selects the partial data divided from the data to be transmitted according to each of the access networks based on the data transmission rate of each of the preset access networks.

For example, when the partial data selector 410 receives the data be transmitted, the partial data selector 410 divides the data into partial data, identifies data transmission rates of access networks (for example, 3G and WiFi), that is, a first transmission rate for data transmission to the first network device 200 and a second transmission rate for data transmission to the second network device 300, selects first partial data to be transmitted to the first network device 200 from the partial data divided from the data to be transmitted based on the identified transmission rates, and selects second partial data to be transmitted to the second network device 300 from the remaining partial data.

The identification information insertion unit 420 inserts identification information for measuring a data reception time interval into two or more particular partial data of the partial data selected for a particular access network. Specifically, the identification information insertion unit 420 selects two or more partial data adjacent on a particular period time and inserts the identification information into the selected partial data.

That is, the identification information insertion unit 420 possesses a preset particular period time in accordance with each of the access networks (for example, 3G and WiFi) used in the simultaneous transmission service, selects two or more adjacent partial data from the partial data selected for the corresponding access network whenever the particular period time corresponding to each of the access networks arrives, and inserts the identification information into the selected partial data.

Figure 7:
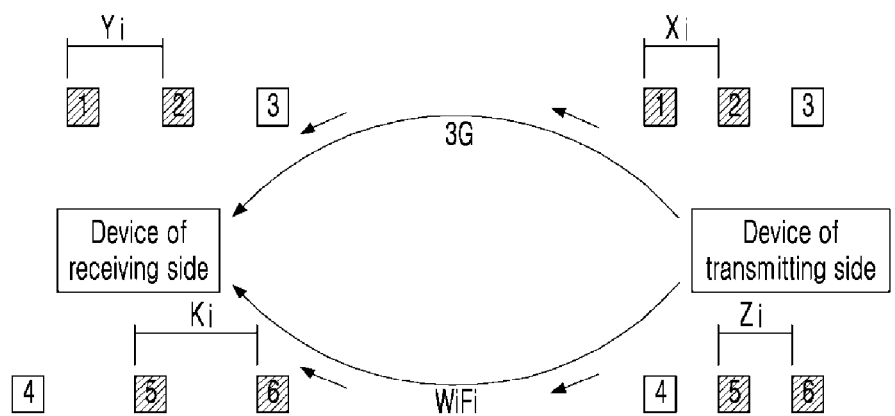
FIG. 7 is a schematic block diagram of an example in which partial data are transmitted by a simultaneous data transmission service over multiple networks to which at least one embodiment of the present disclosure is applied.

Referring to FIG. 7, it is assumed that the management device 400 selects partial data packets 1, 2, and 3 to transmit through the 3G network and selects partial data packets 4, 5, and 6 to transmit through the WiFi network.

At this time, as a particular period time corresponding to the 3G network arrives, the identification information insertion unit 420 selects two or more adjacent partial data, that is, partial data packets 1 and 2 and insert identification information into the selected partial data. Further, as a particular period time corresponding to the WiFi network arrives, the identification information insertion unit 420 selects two or more adjacent partial data, that is, partial data packets 5 and 6 and inserts identification information into the selected partial data.

The communication unit 440 transmits the selected partial data to the device of a receiving side through two or more access networks.

That is, the communication unit 440 transmits a plurality of first partial data selected for the 3G network to the first network device 200 located in the 3G network and transmits a plurality of second partial data selected for the WiFi network to the second network 300 located in the WiFi network, and then the first network device 200 transmits the first partial data to the receiving device 100 and the second network device 300 transmits the second partial data to the receiving device 100.

The controller 430 acquires transmission state information of the particular access network based on at least one of the data transmission time interval between the two or more particular partial data and the data reception time interval measured by the receiving device according to the recognition of the identification information inserted into the two or more particular partial data.

Further, the controller 430 variably sets a data transmission rate of each of the preset access networks based on the transmission state information of the particular access network.

More specifically, when the communication unit 440 transmits the partial data selected for each of the access networks (for example, 3G and WiFi), the controller 430 possesses (generates) the data transmission time interval by recognizing or measuring the data transmission time interval between two or more partial data into which the identification information has been inserted for each of the access networks.

That is, referring to FIG. 7, when the communication unit 440 transmits partial data packets 1, 2, and 3 through the 3G network and partial data packets 4, 5, and 6 through the WiFi network, the controller 430 recognizes or measures a data transmission time interval (x) between the partial data packets 1 and 2 into which the identification information has been inserted with respect to the 3G network and recognize or measure a data transmission time interval (z) between the partial data packets 5 and 6 into which the identification information has been inserted with respect to the WiFi network. Then, the controller 430 generates and stores the data transmission time interval of each of the access networks and manages the generated data transmission time interval.

Further, according to the first embodiment, the controller 430 acquires transmission state information corresponding to each of the access networks by generating transmission state information corresponding to each of two or more access networks based on the data transmission time interval recognized with respect to each of the two or more access networks and the data reception time interval provided from the device of the receiving side with respect to each of the two or more access networks.

That is, the controller 430 receives the data reception time interval measured for each of the access networks (for example, 3G and WiFi) from the terminal device 100 according to the first embodiment.

For example, the controller 430 receives a data reception time interval (y) corresponding to the 3G network and a data reception time interval (k) corresponding to the WiFi network from the device 100 of the receiving side according to the first embodiment.

In this event, the controller 430 generates transmission state information of each of the access networks (for example, 3G and WiFi) based on the data transmission time interval corresponding to each of the access networks (for example, 3G and WiFi) and the data reception time interval corresponding to each of the access networks (for example, 3G and WiFi), that is, the controller 430 predicts a congestion degree.

That is, with respect to the 3G network, the controller 430 generates transmission state information of the 3G network according to equation (1) below.

$$\text{state information} = 1 - \frac{y_i - x_i}{x_i} \quad (1)$$

In equation (1), $x_i$ denotes an i-th data transmission time interval corresponding to the 3G network and $y_i$ denotes an i-th data reception time interval corresponding to the 3G network.

With respect to the 3G network, the transmission state information refers to information calculated according to equation (1) based on the i-th data transmission time interval and the i-th data reception time interval.

The controller 430 generates transmission state information of each of the access networks based on equation (1) for each of the access networks. That is, the transmission state information of each of the access networks has a transmission state information value according to the calculation of equation (1).

At this time, as the data reception time interval (y) becomes larger than the data transmission time interval (x), a transmission delay is more greatly generated and a congestion degree of the corresponding access network, that is, the 3G network becomes larger. Accordingly, as the transmission state information value corresponding to the transmission state information is closer to 1, it is determined that a network state is better. As the transmission state information is closer to 0, it is determined that the network state is worse, that is, more congested.

Further, in order to increase accuracy of the measurement of the transmission state information, the controller 430 derives an average of n pieces of transmission state information generated based on n data transmission time intervals and data reception time intervals collected every period time by inserting and transmitting the identification information on the particular period time as described above and use the average as the transmission state information of each of the access networks.

Meanwhile, the controller 430 according to the second embodiment receives the transmission state information generated for each of the access networks from the terminal device 100 according to the second embodiment. That is, the controller 430 according to the second embodiment acquires the transmission state information by receiving the transmission state information generated for each of the access networks from the terminal device 100 without generating the transmission state information of each of the access networks by itself like in the first embodiment.

Then, the controller 430 variably sets a data transmission rate of each of the preset access networks based on the transmission state information of each of the access networks.

For example, the controller 430 generates the data transmission rate of each of the preset access networks such that the data transmission rate of the access network which does not satisfy a particular condition is adjusted to be lower than a previous data transmission rate, based on the transmission state information of each of the access networks acquired for each of the access networks.

The particular condition corresponds to a transmission state information value which is equal to or larger than 0.

That is, the controller 430 searches for an access network having a transmission state information value which does not satisfy the particular condition, that is, a transmission state information value equal to or smaller than 0 based on the transmission state information value corresponding to the transmission state information generated for each of the access networks (for example, 3G and WiFi). Accordingly, the controller 430 finds the access network (for example, WiFi) having the transmission state information value smaller than or equal to 0.

The controller 430 changes the data transmission rate of each of the preset access networks (for example, 3G:WiFi=2:5) and sets the changed data transmission rate (for example, 3G:WiFi=3:4) such that the data transmission rate of the access network (for example, WiFi 5 (then 4)) having the transmission state information value smaller than or equal to 0 becomes lower (i.e., is set to be lower than a previously set data transmission rate).

For example, the controller 430 changes the data transmission rate of each of the preset access networks (for example, 3G:WiFi=2:5) and sets the changed data transmission rate (for example, 3G:WiFi=3:4) such that the data transmission rate of the access network set to be lower than a previously set data transmission rate lower according to a particular variable policy which reflects the transmission state information value of the WiFi network having the transmission state information value equal to or smaller than 0 and a transmission state information value of another access network (for example, 3G).

Alternatively, the controller 430 determines a first transmission state information value corresponding to state information of a first access network of the access networks and a second transmission state information value corresponding to state information of a second access network. When a difference between the first transmission state information value and the second transmission state information value is larger than a predetermined value, the controller 430 variably sets the data transmission rate of each of the preset access networks such that the data transmission rate of the access network having a smaller transmission state information value between the first access network and the second access network is set (adjusted) to be lower than a previously set data transmission rate.

That is, the controller 430 compares the transmission state information value of each of the access networks with transmission state information values of one or more other access networks based on the transmission state information value corresponding to the transmission state information generated for each of the access networks (for example, 3G and WiFi).

For example, when the access network used in the simultaneous transmission service is WiFi, 3G, or LTE, the controller 430 compares a transmission state information value of WiFi with a transmission state information value of 3G, compares the transmission state information value of WiFi with a transmission state information value of LTE, and compares the transmission state information value of 3G with the transmission state information value of LTE.

As a result of the comparison between the transmission state information value of the first access network (for example, 3G) and the transmission state information value of the second access network (for example, WiFi) with respect to two types of access networks to be compared, that is, the first access network and the second access network, when the difference is larger than a predetermined value, the controller 430 changes a data transmission rate (for example, 3G:WiFi=2:5) of each of the preset access networks and sets the changed data transmission rate (for example, 3G:WiFi=3: 4) such that the data transmission rate of the access network (for example, WiFi) having a smaller transmission state information value between the first access network and the second access network is set to be lower than a previously set data transmission rate.

Here, a difference larger than the predetermined value means a case where the transmission state information having a larger value between the transmission state information of two types of access networks to be compared is n times (for example, two times) larger than the transmission state information having a smaller value.

For example, the controller 430 changes the data transmission rate (for example, 3G:WiFi=2:5) of each of the preset access networks and sets the changed data transmission rate (for example, 3G:WiF=3:4) such that the data transmission rate of the WiFi network is set to be lower than a previous data transmission rate according to a particular variable policy which reflects the transmission state information value of the WiFi network having a smaller transmission state information value between the first access network and the second access network of which the difference is larger than the predetermined value, that is, the 3G network and the WiFi network and the transmission state information value of the other access network (for example, 3G).

Alternatively, the controller 430 absolutely compares the transmission state information values of the respective access networks based on the transmission state information value corresponding to the transmission state information generated for each of the access networks (for example, 3G and WiFi) and determine that the transmission state of the access network having a larger value has a good transmission state, that is, has low congestion. Further, the controller 430 changes the data transmission rate of each of the preset access networks and sets the changed data transmission rate such that the data transmission rate of the access network having the larger value is set to be higher than a previously set data transmission rate.

Meanwhile, the controller 430 changes the data transmission rate of each of the preset access networks and sets the changed data transmission rate such that a data transmission rate of a corresponding access network is set to be higher than a previously set data transmission rate when a current transmission state information value becomes larger than a previous transmission state information value based on the transmission state information value corresponding to the transmission state information generated every particular period time with respect to each of the access networks (for example, 3G and WiFi).

For example, when the current transmission state information value of 0.4 corresponding to the 3G network becomes smaller than the previous transmission state information value (0.6) and the current transmission state information value of 0.2 corresponding to the WiFi network becomes larger than the previous transmission state information value (0), the controller 430 determines that a congestion degree of the WiFi network has become lower and the 3G network has been more congested, and thus changes the data transmission rate of each of the preset access networks and sets the changed data transmission rate such that the data transmission rate of the 3G network is set to be lower than a previously set data transmission rate of the 3G network and the data transmission rate of the WiFi network is set to be higher than a previously set data transmission rate of the WiFi network.

Figure 3:
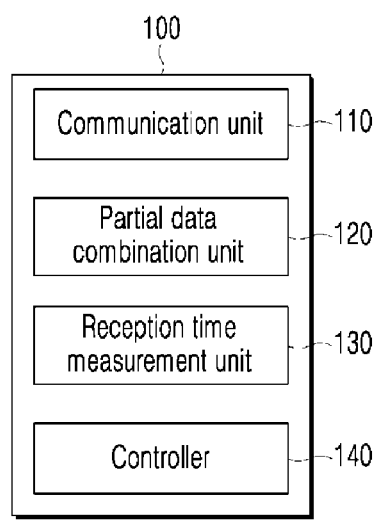
FIG. 3 is a schematic block diagram of a configuration of a simultaneous data transmission/reception device over multiple networks according to at least one embodiment of the present disclosure.

Hereinafter, a configuration of a simultaneous data transmission/reception device over multiple networks according to the present disclosure will be described in more detail with reference to FIG. 3.

The simultaneous data transmission/reception device over multiple networks according to the present disclosure, that is, the terminal device 100 includes a communication unit 110 for receiving partial data divided from data to be transmitted based on a data transmission rate of each of the preset access networks through each of the access networks, a reception time measurement unit 130 for measuring a data reception time interval between two or more particular partial data of which identification information for measuring a data reception time interval of the partial data received for a particular access network is recognized, and a controller 140 for acquiring transmission state information of the particular access network based on at least one of the measured data reception time interval and a data transmission time interval measured by the transmitting device having transmitted the two or more particular partial data.

Further, the device 100 according to the present disclosure further includes a partial data combination unit 120. Other components of the terminal device 100, such as the communication unit 110, the partial data combination unit 120, the reception time measurement unit 130 and the controller 140 are implemented by one or more processors and/or application-specific integrated circuits (ASICs).

The communication unit 110 refers to, for example, a communication module for interworking with the first network device 200 by using the 3G network and interworking with the second network device 300 by using the WiFi network.

Accordingly, the communication unit 110 receives partial data transmitted from the first network device 200 and the second network device 300.

That is, the communication unit 110 receives first partial data from the first network device 200 and second partial data from the second network device 30 according to a data transmission rate (for example, 3G:WiFi=5:5) of each of the access networks preset to the management device 400.

The data combination unit 120 rearranges the partial data received through two or more access networks based on order information. Further, the data combination unit 120 reconstructs the partial data as the data to be transmitted by combining the rearranged partial data.

The reception time measurement unit 130 measures a data reception time interval between two or more particular partial data of which the identification information for measuring a data reception time interval is recognized among from the partial data received for a particular access network.

More specifically, the reception time measurement unit 130 searches for two or more adjacent partial data of which the identification information is recognized, that is, consecutive partial data with respect to each of the two or more access networks (for example, 3G and WiFi) through which the partial data are received and measure a data reception time interval between the partial data.

For example, referring to FIG. 7, the reception time measurement unit 130 monitors the existence of the partial data including the identification information from the partial data received for each of the access networks (for example, 3G and WiFi). As identification information is recognized in partial data packets 1 and 2 among partial data packets 1, 2, and 3 corresponding to the 3G network, the reception time measurement unit 130 determines the partial data packets 1 and 2 as two or more adjacent partial data, that is, consecutive partial data and measures a data reception time interval (y) between the partial data packets 1 and 2. Further, as identification information is recognized in partial data packets 5 and 6 among partial data packets 4, 5, and 6 corresponding to the WiFi network, the reception time measurement unit 130 determines the partial data packets 5 and 6 as two or more adjacent partial data, that is, consecutive partial data and measures a data reception time interval (k) between the partial data packets 5 and 6.

As described above, the reception time measurement unit 130 measures the data reception time interval between the partial data into which the identification information has been inserted for each of the access networks.

The controller 140 acquires transmission state information of the particular access network based on at least one of the measured data reception time interval and the data transmission time interval measured by the transmitting device having transmitted the two or more particular partial data.

More specifically, according to the first embodiment, with respect to each of the two or more access networks, the controller 140 provides the measured data reception time interval to the management device 400, so that the controller 140 supports such that the management device 400 acquires transmission state information corresponding to each of the access networks and further supports such that the data transmission rate of each of the preset access networks is variably set based on the transmission state information.

Meanwhile, according to the second embodiment, the controller 140 generates transmission state information corresponding to each of the two or more access networks based on at least one of the data reception time interval measured with respect to each of the two or more access networks and the data transmission time interval measured by the management device 400 with respect to each of the two or more access networks and provide the generated transmission state information to the management device 400.

That is, according to the second embodiment, the controller 140 acquires the recognized or measured data transmission time interval from the management device 400 with respect to each of the two or more access networks.

For example, the controller 140 receives a data transmission time interval (x) corresponding to the 3G network and a data transmission time interval (z) corresponding to the WiFi network from the management device 400 according to the second embodiment.

In this event, the controller 140 generates transmission state information corresponding to each of the access networks (for example, 3G and WiFi) based on the data reception time interval corresponding to each of the access networks (for example, 3G and WiFi) and the data reception time interval provided from the management device 400 with respect to each of the access networks (for example, 3G and WiFi), that is, the controller 140 predicts a congestion degree.

That is, with respect to the 3G network, the controller 140 generates transmission state information of the 3G network according to equation (1) above.

The controller 140 generates transmission state information of each of the access networks based on equation (1) for each of the access networks.

Further, in order to increase accuracy of the measurement of the transmission state information, the controller 140 derives an average of n pieces of transmission state information generated based on n data transmission time intervals and data reception time intervals collected every period time as the management device 400 inserts and transmits the identification information on the particular period time as described above, and uses the average as the transmission state information of each of the access networks.

Further, the controller 140 provides the generated transmission state information of each of the access networks, so as to support such that the management device 400 acquires transmission state information corresponding to each of the access networks and further support such that the data transmission rate of each of the preset access networks is variably set based on the transmission state information.

Figure 4:
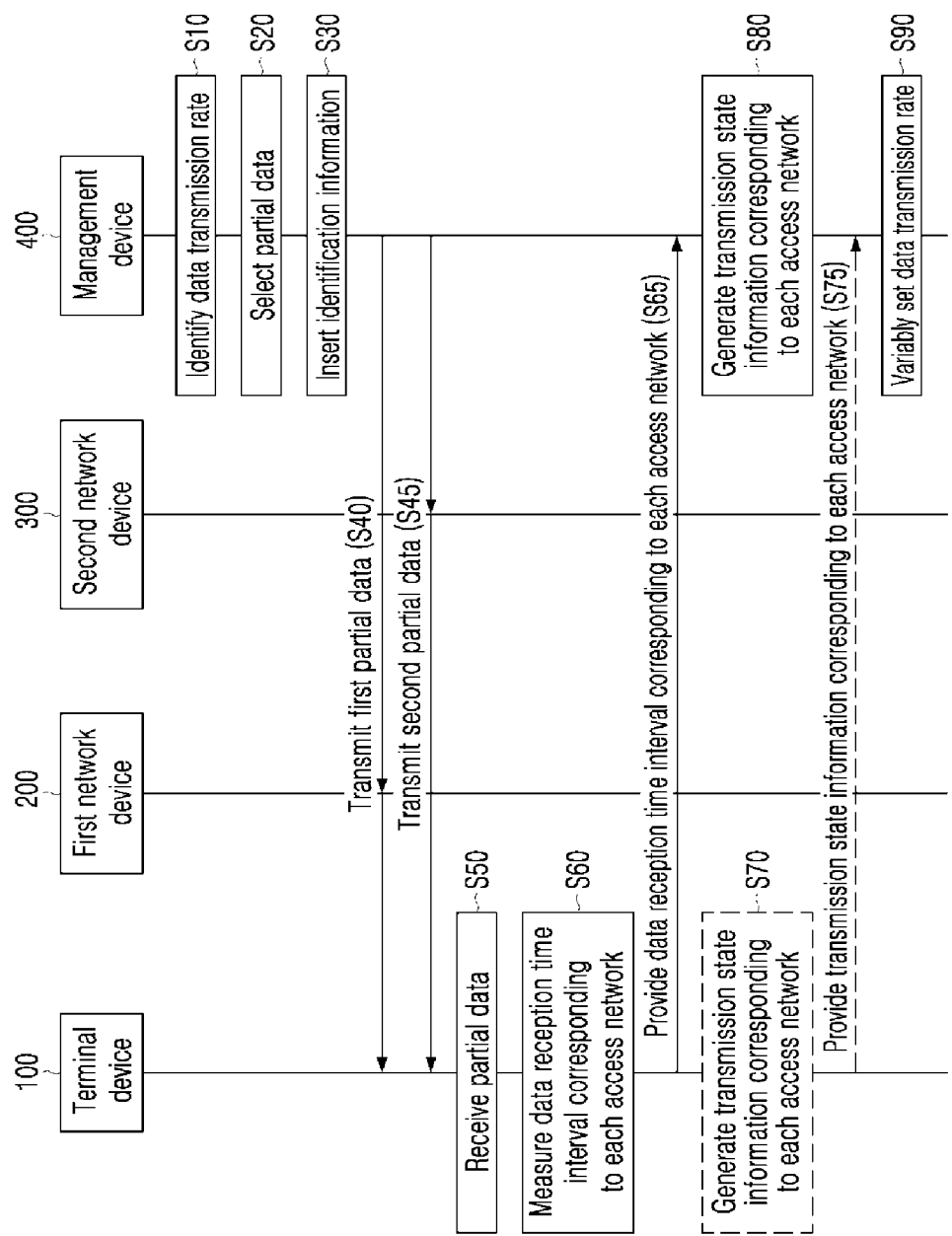
FIG. 4 is a flow diagram of a flow of a simultaneous data transmission service method over multiple networks according to at least one embodiment of the present disclosure.
Figure 5:
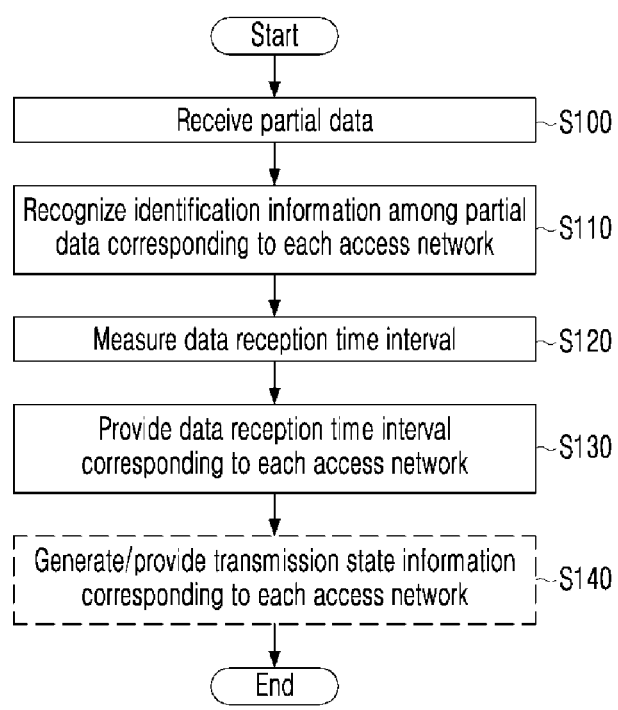
FIG. 5 is a flow diagram of operations of a simultaneous data transmission/reception method over multiple networks according to at least one embodiment of the present disclosure.
Figure 6:
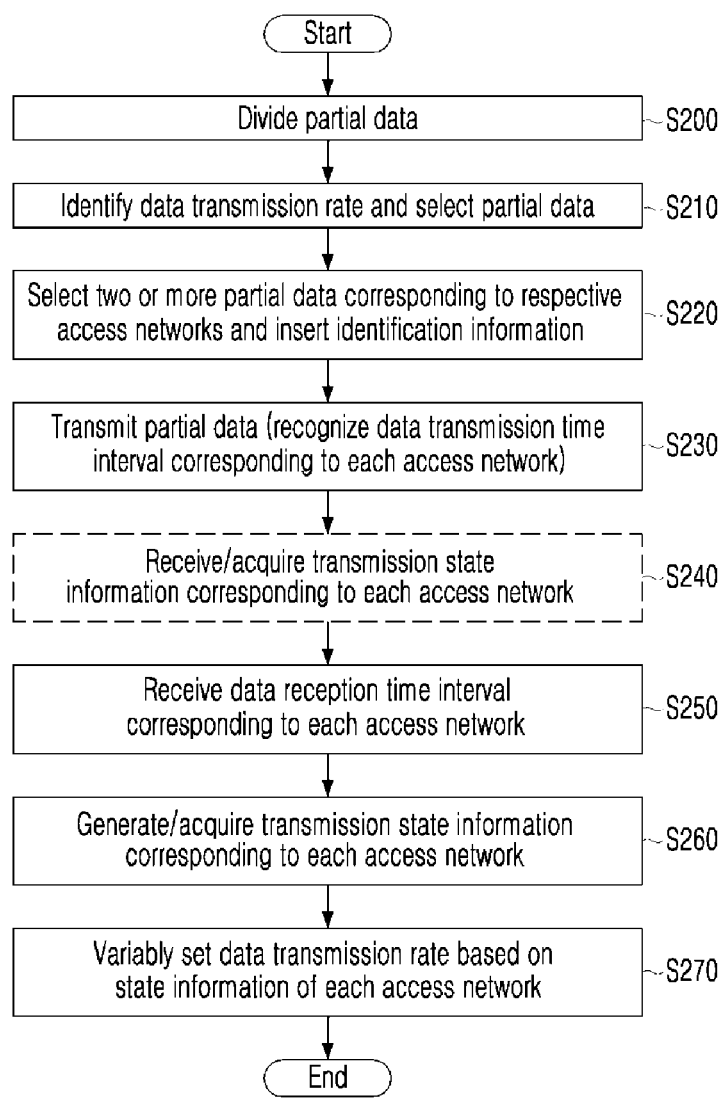
FIG. 6 is a flow diagram of operations of a simultaneous data transmission method over multiple networks according to at least one embodiment of the present disclosure.

Hereinafter a simultaneous data transmission method over multiple networks according to at least one embodiment of the present disclosure will be described with reference to FIGS. 4 to 6. Here, reference numerals of the configurations illustrated in FIGS. 1 and 3 will be referred to describe configurations of FIG. 4 for convenience of the description.

First, a simultaneous data transmission service method over multiple networks according to an exemplary embodiment of the present disclosure will be described with reference to FIG. 4.

For the convenience of description, the following description will be made based on the downlink in which the management device 400 is the transmitting device and the terminal device 100 is the receiving device. However, the following description is equally applied to the uplink, and accordingly, a function of the terminal device 100 in the downlink is performed by the management device 400 in the uplink and a function of the management device 400 in the downlink is performed by the terminal device 400 in the uplink.

When the management device 400 receives data to be transmitted to the terminal device 100 from the external device 500, the management device 400 divides the data into partial data, identifies data transmission rates of access networks (for example, 3G and WiFi), that is, a first transmission rate for data transmission to the first network device 200 and a second transmission rate for data transmission to the second network device 300 in step S10, and selects first partial data to be transmitted to the first network device 200 from the partial data divided from the data to be transmitted based on the identified transmission rates and selects second partial data to be transmitted to the second network device 300 from the remaining partial data in step S20.

Further, the management device 400 inserts identification information for measuring a data reception time interval into two or more particular partial data of the partial data selected for a particular access network in step S30.

Thereafter, the management device 400 transmits each of the partial data selected for each of the access networks (for example, 3G and WiFi) through each of the access networks (for example, 3G and WiFi), the first network device 200 transmits the first partial data transmitted from the management device 400 to the terminal device 100 in step S40, and the second network device 300 transmits the second partial data transmitted from the management device 400 to the terminal device 100 in step S45.

At this time, in transmitting the partial data selected for each of the access networks, the management device 400 recognizes or measures a data transmission time interval between two or more partial data into which the identification information has been inserted for each of the access networks.

Then, the terminal device 100 receives the partial data through the two or more access networks in step S50, rearrange the received partial data according to a division order based on order information of the partial data, and combine the rearranged partial data, so as to reconstruct the data to be transmitted.

At this time, the terminal device 100 measures a data reception time interval between two or more particular partial data of which the identification information for measuring a data reception time interval is recognized among from the partial data received for the particular access network in step S60.

Then, the terminal device 100 acquires transmission state information of the particular access network generated based on at least one of the measured data reception time interval and the data transmission time interval measured by the management device 400 having transmitted the two or more particular partial data. Further, based on the transmission state information of the particular access network, the terminal device 100 variably sets the data transmission rate of each of the access networks preset by the management device 400.

According to the first embodiment, when the terminal device 100 provides the data reception time interval measured for each of the access networks (for example, 3G and WiFi) to the management device 400 in step S65, the management device 400 receives the data reception time interval measured for each of the access networks (for example, 3G and WiFi).

Prior to the above, in transmitting the partial data selected for each of the access networks (for example 3G and WiFi), the management device 400 possessed (generated) the data transmission time interval by recognizing or measuring the data transmission time interval between two or more partial data into which the identification information has been inserted for each of the access networks.

Accordingly, the management device 400 acquires the transmission state information of each of the access networks in step S80 by generating the transmission state information corresponding to each of the two or more access networks (for example, 3G and WiFi) based on the data transmission time interval recognized for each of the access networks (for example, 3G and WiFi) and the data reception time interval acquired from the terminal device 100 for each of the access networks (for example, 3G and WiFi).

That is, the management device 400 may generate transmission state information of the 3G network based on the data transmission time interval corresponding to the 3G network and the data reception time interval corresponding to the data transmission time interval and generate transmission state information of the WiFi network based on the data transmission time interval corresponding to the WiFi network and the data reception time interval corresponding to the data transmission time interval.

Meanwhile, according to the second embodiment, when the terminal device 100 provides the transmission state information generated for each of the access networks to the management device 400, the management device 400 acquires the transmission state information for each of the access networks without generating the transmission state information for each of the access networks by itself.

The management device 400 variably sets the data transmission rate for each of the preset access networks based on the transmission state information for each of the access networks which has been generated by itself or provided and then acquired.

Hereinafter, a simultaneous data transmission/reception method over multiple networks according to the present disclosure, that is, an operation method of the device of the receiving side will be described with reference to FIG. 5.

The partial data divided from the data to be transmitted based on the data transmission rate of each of the preset access networks are received through two or more networks in step S100. That is, the device of the receiving side receives first partial data from the first network device 200 and second partial data from the second network device 30 according to a data transmission rate (for example, 3G:WiFi=5:5) of each of the access networks preset to the management device 400.

Thereafter, the device of the receiving side searches for two or more adjacent partial data of which the identification information is recognized for each of the two or more access networks (for example, 3G and WiFi) through which the partial data are received, that is, consecutive partial data in step S110 and measure a data reception time interval between the partial data in step S120.

Further, the device of the receiving side acquires transmission state information of the particular access network generated based on at least one of the measured data reception time interval and the data transmission time interval measured by the management device 400 having transmitted the two or more particular partial data.

According to the first embodiment, with respect to each of the two or more access networks, the device of the receiving side provides the measured data reception time interval to the management device 400 in step S130, and thus supports such that the transmission state information corresponding to each of the access networks is acquired and further supports such that the data transmission rate of each of the preset access networks is variably set based on the transmission state information.

Meanwhile, according to the second embodiment, the device of the receiving side may generate transmission state information corresponding to each of the two or more access networks based on at least one of the data reception time interval measured with respect to each of the two or more access networks and the data transmission time interval measured by the management device 400 with respect to each of the two or more access networks and provide the generated transmission state information to the management device 400 in step S140.

Hereinafter, a simultaneous data transmission method over multiple networks according to the present disclosure, that is, an operation method of the device of the transmitting side will be described with reference to FIG. 6.

The device of the transmitting side divides the data to be transmitted into a plurality of partial data in step S200. Further, the device identifies data transmission rates of access networks (for example, 3G and WiFi), that is, a first transmission rate for data transmission to the first network device 200 and a second transmission rate for data transmission to the second network device 300, selects first partial data to be transmitted to the first network device 200 from the plurality of partial data divided from the data to be transmitted based on the identified transmission rates, and selects second partial data to be transmitted to the second network device 300 from the remaining of the plurality of partial data in step S210. Herein, the first partial data indicate two or more partial data selected from the plurality of partial data divided from the data, assigned to be transmitted to the first network device 200 over the first access network (e.g, 3G). The second partial data indicate other two or more partial data selected from the plurality of partial data divided from the data, assigned to be transmitted to the second network device 200 over the second access network (e.g, WiFi).

Thereafter, identification information (hereinafter, referred to as first identification information) for measuring a data reception time interval is inserted into the selected two or more partial data among the first partial data to be transmitted over the first access network in step S220. Another identification information (hereinafter, referred to as second identification information) for measuring a data reception time interval is also inserted into the selected two or more partial data among the second partial data to be transmitted over the second access network in step S220

Next, the selected first and second partial data are respectively transmitted to the terminal device 100 through two or more access networks (e.g., first and second access networks) in step S230.

At this time, in transmitting each of the selected partial data (i.e., the first partial data and the second partial data) over each of the access networks (for example 3G and WiFi), the device of the transmitting side generates the data transmission time interval by recognizing or measuring the data transmission time interval between the two or more partial data into which each of the identification information (i.e., the first identification information and the second identification information) has been inserted for each of the access networks.

That is, referring to FIG. 7, it is exemplarily assumed that the device of the transmitting side divides the data into a plurality of partial data (i.e., partial data packets 1, 2, 3, 4, 5 and 6 exemplarily shown in FIG. 7). It is further assumed that the device of the transmitting side respectively selects, from the plurality of partial data (i.e., partial data packets 1, 2, 3, 4, 5 and 6 exemplarily shown in FIG. 7), the first partial data (i.e., partial data packets 1, 2 and 3) to be transmitted to the first network device 200 over the first access network (e.g., 3G network), and the second partial data (i.e., partial data packets 4, 5 and 6) to be transmitted to the second network device 300 over the second access network (e.g., WiFi network). It is furthermore assumed that the identification information (i.e., the first identification information) is inserted into the selected two or more partial data (i.e., partial data packets 1 and 2) among the first partial data (i.e., partial data packets 1, 2 and 3), and the another identification information (i.e., the second identification information) is inserted into the selected two or more partial data (i.e., partial data packets 5 and 6) among the second partial data (i.e., partial data packets 4, 5 and 6). When the device of the transmitting side transmits partial data packets 1, 2, and 3 through the 3G network and partial data packets 4, 5, and 6 through the WiFi network, the device of the transmitting side recognizes or measures a data transmission time interval (x, for example $x_i$ in FIG. 7) between the partial data packets 1 and 2 into which the identification information (i.e., the first identification information) has been respectively inserted with respect to the 3G network, and also recognizes or measures a data transmission time interval (z, for example $z_i$ in FIG. 7) between the partial data packets 5 and 6 into which the identification information (i.e., the second identification information) has been respectively inserted with respect to the WiFi network. Then, the device of the transmitting side generates and stores the data transmission time interval of each of the access networks (i.e., 3G network and WiFi network) and manages the generated data transmission time interval.

The device of the transmitting side acquires transmission state information of the particular access network (i.e., 3G network and WiFi network) generated based on at least one of (i) the data transmission time interval between the two or more particular partial data (e.g., partial data packets 1 and 2, or partial data packets 5 and 6) and (ii) the data reception time interval measured by the terminal device 100 according to the recognition of the identification information (e.g, the first identification information or the second identification information)) inserted into the two or more particular partial data.

Further, the device of the transmitting side variably sets a data transmission rate of each of the preset access networks based on the transmission state information of the particular access network.

According to the first embodiment of the present disclosure, the device of the transmitting side generates the transmission state information corresponding to each of two or more access networks based on the data transmission time interval measured with respect to each of the two or more access networks and the data reception time interval provided from the terminal device 100 with respect to each of the two or more access networks.

That is, the device of the transmitting side receives the data reception time interval measured for each of the access networks (for example, 3G and WiFi) from the terminal device 100 according to the first embodiment.

For example, the device of the transmitting side receives a data reception time interval (y, for example $y_i$ in FIG. 7) corresponding to the 3G network and a data reception time interval (k, for example $k_i$ in FIG. 7) corresponding to the WiFi network from the device 100 of the receiving side according to the first embodiment in step S250.

In this event, the device of the transmitting side generates transmission state information of each of the access networks (for example, 3G and WiFi) based on the data transmission time interval corresponding to each of the access networks (for example, 3G and WiFi) and the data reception time interval provided from the terminal device 100 with respect to each of the access networks (for example, 3G and WiFi). The device of the transmitting side predicts a congestion degree based on the generated transmission state information of each of the access networks in step S260.

That is, with respect to the 3G network, the transmission state information of the 3G network is generated according to equation (1) described above.

The device of the transmitting side generates transmission state information of each of the access networks based on equation (1) for each of the access networks. That is, the transmission state information of each of the access networks has a value of the transmission state information resulted from the calculation of equation (1).

At this time, as the data reception time interval (y) becomes larger than the data transmission time interval (x), a transmission delay is more greatly generated and a congestion degree of the corresponding access network, that is, the 3G network becomes larger. Accordingly, as the value of the transmission state information is closer to 1, it is determined that a network state is better. As the value of the transmission state information is closer to 0, it is determined that the network state is worse, that is, more congested.

Further, in order to increase accuracy of the measurement of the transmission state information, the device of the transmitting side derives an average of n pieces of transmission state information generated based on n data transmission time intervals and n data reception time intervals collected every period time by inserting and transmitting the identification information on the particular period time as described above and use the average as the transmission state information of each of the access networks.

Meanwhile, according to the second embodiment of the present disclosure, the transmission state information generated for each of the access networks is provided from the terminal device 100 according to the second embodiment in step S240. That is, the device of the transmitting side receives from the terminal device 100 the transmission state information on each of the access networks, generated by the terminal device 100, In other words, the device of the transmitting side itself does not generate the transmission state information of each of the access networks.

Then, the device of the transmitting side variably sets a data transmission rate of each of the preset access networks based on the transmission state information of each of the access networks in step S270.

For example, the device of the transmitting side variably sets the data transmission rate of each of the preset access networks such that the data transmission rate of each of the access networks which does not satisfy a particular condition is set to be lower than a previously set data transmission rate based on the transmission state information of each of the access networks.

It is exemplarily assumed that the particular condition, indicates a value of the transmission state information, which is resulted from the calculation of equation (1) and is equal to or larger than 0.

That is, the device of the transmitting side searches for an access network having a value of the transmission state information which does not satisfy the particular condition based on the value of the transmission state information value corresponding to the transmission state information generated for each of the access networks (for example, 3G and WiFi). The value of transmission state information which is resulted from the calculation of equation (1) is equal to or smaller than 0. Accordingly, the device of the transmitting side finds the access network (for example, WiFi) having the value of the transmission state information value smaller than or equal to 0.

The controller 430 changes the data transmission rate (for example, assuming the data transmission rate is initially set as 3G:WiFi=2:5) of each of the preset access networks and sets the changed data transmission rate (for example, 3G:WiFi=3:4) such that the data transmission rate of the access network (for example, WiFi) having the value of the transmission state information which is smaller than or equal to 0 becomes lower (i.e., the data transmission rate for WiFi is eventually set to be lower than a previously set data transmission rate)

For example, the device of the transmitting side changes the data transmission rate (for example, assuming the data transmission rate is initially set as 3G:WiFi=2:5) of each of the preset access networks and sets the changed data transmission rate (for example, 3G:WiFi=3:4) such that the data transmission rate of the corresponding access network is set to be lower than a previously set data transmission rate according to a variable policy. Herein, the variable policy reflects (i) the value of transmission state information of the WiFi network having the value of the transmission state information which is equal to or smaller than 0 as well as (ii) a value of the transmission state information of another access network (for example, 3G).

Alternatively, the device of the transmitting side determines a value of a first transmission state information corresponding to the first access network (e.g., 3G network) and a value of a second transmission state information corresponding to the second access network (e.g., WiFi network). When a difference between the value of the first transmission state information and the value of the second transmission state information is larger than a setting value (i.e., a preset value), the controller 430 variably sets the data transmission rate of each of the preset access networks such that the data transmission rate of the access network, having a smaller value between the value of the transmission state information of the first access network and the value of the transmission state information of the second access network, is set to be lower than a previously set data transmission rate of the access network.

That is, the device of the transmitting side compares the transmission state information value of each of the access networks with transmission state information values of one or more other access networks based on the transmission state information value corresponding to the transmission state information generated for each of the access networks (for example, 3G and WiFi). For example, when the access network used in the simultaneous transmission service is WiFi, 3G, or LTE, the device of the transmitting side compares a transmission state information value of WiFi with a transmission state information value of 3G, compares the transmission state information value of WiFi with a transmission state information value of LTE, and compares the transmission state information value of 3G with the transmission state information value of LTE.

As a result of the comparison between the value of the transmission state information of the first access network (for example, 3G) and the value of the transmission state information of the second access network (for example, WiFi), when the difference is larger than a setting value (i.e., a preset value), the controller 430 changes a data transmission rate (for example, assuming the data transmission rate is initially set as 3G:WiFi=2:5) of each of the preset access networks and sets the changed data transmission rate (for example, 3G:WiFi=3:4) such that the data transmission rate of the access network (for example, WiFi), having a smaller value between the value of the transmission state information of the first access network and the value of the transmission state information of the second access network, is set to be lower than a previously set data transmission rate.

Here, a difference larger than the setting value means a case where the transmission state information having a larger value between the transmission state information of two types of access networks to be compared is n times larger than the transmission state information having a smaller value.

For example, the device of the transmitting side changes the data transmission rate (for example, 3G:WiFi=2:5) of each of the preset access networks and sets the changed data transmission rate (for example, 3G:WiF=3:4) such that the data transmission rate of the WiFi network is set to be lower than a previously set data transmission rate of the WiFi network according to a variable policy. Herein, the variable policy reflects the value of the transmission state information of the WiFi network having a smaller value between the value of the transmission state information of the first access network and the value of the transmission state information of the second access network in case where the difference is larger than the setting value, that is, the 3G network and the WiFi network and the transmission state information value of the other access network (for example, 3G).

According to the various embodiments of the present disclosure, in a simultaneous transmission service in which data is divided into a plurality of partial data and the divided partial data are transmitted/received through a plurality of networks, it obtain an advantageous effect to set a partial data transmission rate of each of the networks by using transmission state information of each of the networks identified based on a partial data transmission time interval and reception time interval.

Meanwhile, the various embodiments of the present disclosure are implemented in the form of program commands that is executed through various computer means and recorded in a non-transitory computer-readable recording medium. The non-transitory computer-readable recording medium includes a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that are executed by a computer using an interpreter or the like, as well as a machine code generated by a compiler. The hardware devices are configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure has been described for illustrative purposes, those skilled in the art will appreciate that various modifications, additions and substitutions are possible, without departing from the characteristics of the disclosure. That is, it is understood that the present disclosure is not limited to these embodiments but various changes and modifications are made by one ordinarily skilled in the art within the subject matter, the spirit and scope of the claimed invention as hereinafter claimed. Specific terms used in this disclosure and drawings are used for illustrative purposes and not to be considered as limitations of the present disclosure.

The invention claimed is:

1. A transmitting device, comprising:
a partial data selector configured to select partial data divided from data to be transmitted over each of access networks based on a data transmission rate of each of the access networks;
an identification information insertion unit configured to
obtain a preset period time in accordance with each of the access networks,
select, on the preset period time, two or more partial data among the selected partial data whenever the preset period time arrives, and
respectively insert identification information for measuring a data reception time interval into the selected two or more partial data;
a communication unit configured to transmit the selected two or more partial data with the inserted identification information to a receiving device through a particular access network; and
a controller configured to acquire transmission state information of the particular access network based on at least one of (i) a data transmission time interval between the transmitted two or more partial data and (ii) a data reception time interval measured by the receiving device based on the identification information inserted into the transmitted two or more partial data.

2. The transmitting device of claim 1, wherein the controller is configured to set the corresponding data transmission rate of each of the access networks based on the transmission state information of the particular access network.

3. The transmitting device of claim 1, wherein the controller is configured to variably set the corresponding data transmission rate of each of the access networks based on transmission state information of each of the access networks acquired for each of the access networks such that the corresponding data transmission rate of the access network which does not satisfy a particular condition is adjusted to be lower than a previously set data transmission rate.

4. The transmitting device of claim 1, wherein the controller is configured to
determine a first transmission state information value of a first access network of the access networks and a second transmission state information value of a second access network of the access networks, and
set the corresponding data transmission rate of each of the access networks such that a data transmission rate of the access network having a smaller transmission state information value between the first access network and the second access network is adjusted to be lower than a previously set data transmission rate when a difference between the first transmission state information value and the second transmission state information value is larger than a predetermined value.

5. The transmitting device of claim 1, wherein the two or more partial data are adjacent to each other among the partial data selected for transmission over the particular access network of the access networks.

6. A receiving device, comprising:
a communication unit configured to receive partial data divided from data to be transmitted over a corresponding access network of access networks based on a data transmission rate of each of the access networks, the receive partial data including two or more partial data into which identification information used for measuring a data reception time interval has been inserted;
a reception time measurement unit configured to measure the data reception time interval between the two or more partial data among the received partial data; and
a controller configured to acquire transmission state information of the corresponding access network based on at least one of (i) the measured data reception time interval and (ii) a data transmission time interval of the two or more partial data,
wherein the identification information has been inserted into the two or more partial data selected on a preset period time, and
the two or more partial data have been selected whenever the preset period time arrives.

7. The receiving device of claim 6, wherein the data transmission time interval has been measured by a transmitting device based on the identification information inserted into the two or more particular partial data, and
the measured data transmission time interval is received from the transmitting device.

8. The receiving device of claim 6, wherein the two or more partial data are adjacent partial data among the received partial data.

9. A method of operating a transmitting device, the method comprising:
selecting partial data divided from data to be transmitted over each of access networks based on a data transmission rate of each of the access networks;
obtaining a preset period time in accordance with each of the access networks;
selecting, on the preset period time, two or more partial data among the selected partial data whenever the period time arrives;
respectively inserting identification information for measuring a data reception time interval into the selected two or more partial data;
transmitting the selected two or more partial data to a receiving device through a particular access network; and
acquiring transmission state information of the particular access network based on at least one of a data transmission time interval between the two or more partial data and a data reception time interval measured by the receiving device based on the identification information inserted into the transmitted two or more partial data.

10. The method of claim 9, further comprising:
setting the corresponding data transmission rate of each of the access networks based on the transmission state information of the particular access network.

11. The method of claim 10, wherein the setting of the data transmission rate comprises
setting the corresponding data transmission rate of each of the access networks based on transmission state information of each of the access networks acquired for each of the access networks such that the corresponding data transmission rate of the access networks which does not satisfy a particular condition is adjusted to be lower than a previously set data transmission rate.

12. The method of claim 10, wherein the setting of the data transmission rate comprises
determining a value of a first transmission state information of a first access network of the access networks and a value of a second transmission state information of a second access network, and
setting the corresponding data transmission rate of each of the preset access networks such that a data transmission rate of the access network having a smaller transmission state information value between the first access network and the second access network is adjusted to be lower than a previously set data transmission rate when a difference between a value of the first transmission state information and a value of the second transmission state information is larger than a predetermined value.

13. The method of claim 9, wherein the two or more partial data are adjacent to each other among the partial data selected for transmission over the particular access network of the access networks.

14. A method of operating a receiving device, the method comprising:
receiving partial data divided from data to be transmitted over a corresponding access network of access networks based on a data transmission rate of each of the access networks, the receive partial data including two or more partial data into which identification information used for measuring a data reception time interval has been inserted;
measuring the data reception time interval between the two or more partial data among the received partial data; and
acquiring transmission state information of a particular access network based on at least one of (i) the measured data reception time interval and (ii) a data transmission time interval,
wherein the identification information has been inserted into the two or more partial data selected on a preset period time, and
the two or more partial data have been selected whenever the preset period time arrives.

15. The method of claim 14, wherein the data transmission time interval is measured by a transmitting device based on the identification information inserted into the two or more particular partial data, and
the measured data transmission time interval is received from the transmitting device.

16. The method of claim 14, wherein the two or more partial data are adjacent partial data among the received partial data.

* * * * *